United States Patent [19]

Aboytes

[11] B 3,914,148

[45] Oct. 21, 1975

[54] BONDING METALS TO ELASTOMER SYSTEMS UTILIZING NITROGENOUS TREATED FURNACE BLACKS

[75] Inventor: Peter Aboytes, Borger, Tex.

[73] Assignee: J. M. Huber Corporation, Locust, N.J.

[22] Filed: May 8, 1972

[21] Appl. No.: 251,109

[44] Published under the Trial Voluntary Protest Program on January 28, 1975 as document no. B 251,109.

Related U.S. Application Data

[63] Continuation-in-part of Ser. No. 90,810, Nov. 18, 1970, Pat. No. 3,676,256.

[52] U.S. Cl. ............. 156/306; 106/307; 117/128.7; 117/133; 152/357; 156/338; 427/388; 428/465; 428/492; 260/763

[51] Int. Cl.$^2$ B32B 15/06; B44D 1/34; C08C 11/18

[58] Field of Search ......... 106/307; 117/128.7, 133; 156/306, 338; 161/221, 239, 222; 260/763; 152/357; 428/465, 492; 427/388

[56] References Cited

UNITED STATES PATENTS

| | | | |
|---|---|---|---|
| 2,522,137 | 9/1950 | Schaffer | 161/222 X |
| 2,635,975 | 4/1953 | Peters | 161/222 |
| 2,960,426 | 11/1960 | O'Mahoney | 156/306 X |
| 3,184,290 | 5/1965 | Jordan | 106/307 X |
| 3,301,694 | 1/1967 | Kraus et al. | 106/307 |
| 3,336,148 | 8/1967 | Gunnell et al. | 106/307 |
| 3,398,009 | 8/1968 | Deery | 106/307 |
| 3,523,812 | 8/1970 | Kraus | 106/307 |
| 3,565,657 | 2/1971 | Dannenberg et al. | 106/307 |

*Primary Examiner*—Charles E. Van Horn
*Assistant Examiner*—Robert A. Dawson
*Attorney, Agent, or Firm*—Harold H. Flanders

[57] ABSTRACT

The new use of furnace carbon blacks which have been oxidized with nitrogenous oxidizing agents to provide improved adhesion in elastomer to metal bonding systems is disclosed.

1 Claim, No Drawings

BONDING METALS TO ELASTOMER SYSTEMS UTILIZING NITROGENOUS TREATED FURNACE BLACKS

RELATION TO CO-PENDING APPLICATIONS

The present application is a continuation-in-part of U.S. Pat. application Ser. No. 90,810, filed Nov. 18, 1970, now U.S. Pat. No. 3,676,256.

BACKGROUND OF THE INVENTION

The present invention relates to rubber vulcanizate systems and, more particularly, to the use of furnace carbon blacks which have been oxidized with nitrogenous oxidizing acids to produce improved adhesion of such systems to metallic surfaces.

As known in the art, adhesion of vulcanizates to metallic wires used in belted tires has long been a major problem in the industry with the separation of the vulcanizate and the metallic belt wire being frequently observed.

In this regard, the prior art has tried a number of the various grades of carbon black as reinforcing agents without successfully solving this problem. In general, the industry has considered channel black to be the best product available in solving this problem. Prior artisans have also attempted and proposed a wide variety of other approaches to the problem of bonding elastomers and metals again, however, without having successfully solved the problem to the industry's satisfaction. Examples of such prior art approaches are disclosed in U.S. Pat. Nos. 2,720,479; 3,054,712; 3,423,270; 3,425,886; 3,476,642; 3,480,508; and British Pat. No. 1,169,366.

While a number of carbon blacks, including furnace blacks, both untreated and treated with modifying agents, have been tried as replacements for channel blacks in the solution of the elastomer-metal bonding problem these blacks have uniformly resulted in elastomer-metal adhesion inferior to that produced by channel black. Since channel black represents the generally accepted minimum requirement for an acceptable tire, the search for an acceptable substitute material for channel black in the solution of the bonding problem has continued.

SUMMARY OF THE INVENTION

In summary, the present invention relates to the new use of furnace carbon blacks which have been oxidized with nitrogenous oxidizing acids to produce vulcanizate to metal bonding in belted tires.

Methods for producing such nitrogenous oxidized furnace blacks are well known in the art. Such products and methods for preparing same are disclosed, for example, in U.S. Pat. Nos. 2,681,107; 3,023,118; 3,184,290; and 3,398,009.

However, to the inventor's knowledge, it has not been proposed in the prior art that furnace carbon blacks which have been oxidized with nitrogenous oxidizing agents would provide adhesion superior to channel blacks in elastomer to metal bonding systems and this fact does not appear to have been recognized by the industry. Additionally, this present invention is based on the discovery that such blacks often provide superior adhesion than the air oxidizing blacks as claimed in the aforementioned U.S. patent application Ser. No. 90,810.

Accordingly, it is a general object of the present invention to provide a new and highly effective solution to the bonding problem between elastomers and metals and to thereby overcome the deficiencies of the prior art.

The manner in which the foregoing and other objects are achieved in accordance with the present invention will be better understood in view of the following detailed description wherein particularly advantageous composition and method embodiments are disclosed for illustrative purposes.

DESCRIPTION OF THE PREFERRED EMBODIMENTS

The present invention overcomes the deficiencies of the prior art attempts at a solution of the bonding problem and achieves its objectives by the use of furnace carbon blacks which have been oxidized with nitrogenous oxidizing agents or acids to reinforce rubber vulcanizates and simultaneously produce improved adhesion of the rubber vulcanizates to metallic surfaces.

As previously discussed such modified carbon blacks and methods for preparing same are well known art disclosed in the above noted patents. As used herein, the term "nitrogenous oxidizing agents" or "nitrogenous oxidizing acids" is defined as, and intended to include nitric acid and nitrogen oxides. Oxidizing nitrogen oxides are well known and include, for instance, nitrogen dioxide, nitrogen tetroxide and nitrogen pentoxide. When nitric acid is the oxidizing agent to be utilized, said acid can be fuming, concentrated or dilute and can be utilized in liquid or vapor form. Generally speaking, however, nitric acid of at least 40% concentration is preferred.

It has been found, as shown in the examples below, that such a nitrogenous oxidized furnace carbon black, when compounded in a conventional rubber formulation and vulcanized in contact with the brass surface, results in a vulcanizate to metal adhesion superior to that produced by channel blacks.

In order to better illustrate the understanding of the present invention, a series of examples demonstrating the superior adhesion are set forth hereinbelow. These examples are not to be construed as limiting the invention but are exemplary only.

EXAMPLE 1

As a control, 45 parts of a channel carbon black were compounded with 100 parts of number one smoked sheets in a standard formulation containing minor parts of zinc oxide, stearic acid, pine tar, sulfur and additives; and cured at 300° F for a period of time equal to 1.2 times the time to 90% of maximum viscosity. Test pads having dimensions of approximately 1 × 8 × ¼ inches were prepared and cured to optimum state of cure at 300° F in contact and together with a plurality of conventional brass plated wires used in tire belts positioned transverse to the length of and between two of the test pads. These test blocks were then tested according to the ASTM "Standard Method of Testing for Adhesion of Vulcanized Rubber to Wire Cord" (D2229-68). In repeated tests the channel blab-2 produced an average adhesive force of 280 pounds and a percentage of coverage of elastomer on he wire following failure of the bond of approximately 75%.

EXAMPLE 2

As a further control, Example 1 was repeated employing an untreated high structure, high abrasion furnace carbon black in lieu of the channel black of Example 1. In repeated tests the average adhesive force produced by this bond was 250 pounds and the percentage of cover obtained was on the order of 25%.

EXAMPLE 3

Example 1 was repeated except with an oxidized carbon black of the type described in Example 2 which was oxidized with $HNO_3$ (15%) at 300° C for 60 minutes. The specific procedures followed in producing the black were that as disclosed in U.S. Pat. No. 3,398,009. Repeated tests of this bond produced an average adhesive force of about 300 pounds and a percentage of coverage on the order of 90%. This result indicates that the failure was cohesion (elastomer-elastomer) rather than adhesive (elastomer-metal).

EXAMPLE 4

Example 3 was repeated except that the furnace carbon black was oxidized with $NO_2$ (8%) at 300° C.

The results of the above examples may be clearly compared in the following table:

TABLE I

| EXAMPLE NUMBER | TYPE OF BLACK | ADHESION (Pounds) | COVERAGE % |
|---|---|---|---|
| 1 | Channel | 280 | 75 |
| 2 | Furnace Black | 250 | 25 |
| 3 | $HNO_3$ Oxidized Furnace Black | 320 | 90 |
| 4 | $NO_2$ Oxidized Furnace Black | 330 | 90 |

While the applicant does not wish to be bound by any particular theory or explanation of the above unexpected results, it is believed that the strong adhesion of the oxidized black bonds may be caused by the presence of polar groups introduced on the carbon black by the process of oxidation, such as COOH, OH, CHO, C=O, etc. Other polar groups in the form of $-NR_1R_2$, where $R_1$ and $R_2$ may be aryl, aralkyl, alkyl, cycloalkyl or hydrogen; and the like may be produced on the carbon black surface by various known processes.

In order to obtain the benefits of the present invention it is believed necessary to produce polar groups on the carbon black in excess of those present on channel black. As indicated above, any method of oxidation with the nitrogenous oxidizing acids or agents, such as disclosed in U.S. Pat. Nos. 2,686,107; 3,023,118; 3,184,290; and 3,398,009 may be employed.

The amount of oxidized carbon black added may, of course, vary as those skilled in the art are aware. For example, between about 10 parts to over 100 parts of the carbon black per 100 parts of rubber in the composition may be employed. Preferred embodiments include the use of at least 10 parts of the black per 100 parts of the rubber in the composition.

The present invention is thus not limited to the particular means of oxidation or quantity of addition but covers all changes and modifications of the specific method and examples of the invention herein disclosed which do not constitute departures from the spirit and scope of the claimed invention.

What is claimed is:

1. A method for producing an improved adhesive bond between rubber vulcanizates and a brass surface comprising adding at least 10 parts by weight of a furnace carbon black which has been oxidized with a nitrogenous oxidizing agent per 100 parts of rubber in the composition, and vulcanizing the rubber composition in the presence of sulfur while in contact with the brass surface.

* * * * *